April 23, 1968  J. W. RYAN ET AL  3,379,084
VISUAL EFFECT MEANS FOR MUSIC BOX TOY
Filed Jan. 3, 1966  2 Sheets-Sheet 1

INVENTORS
JOHN W. RYAN
JACOB DEGELDER

BY Herzig, Walsh & Blackburn
ATTORNEYS

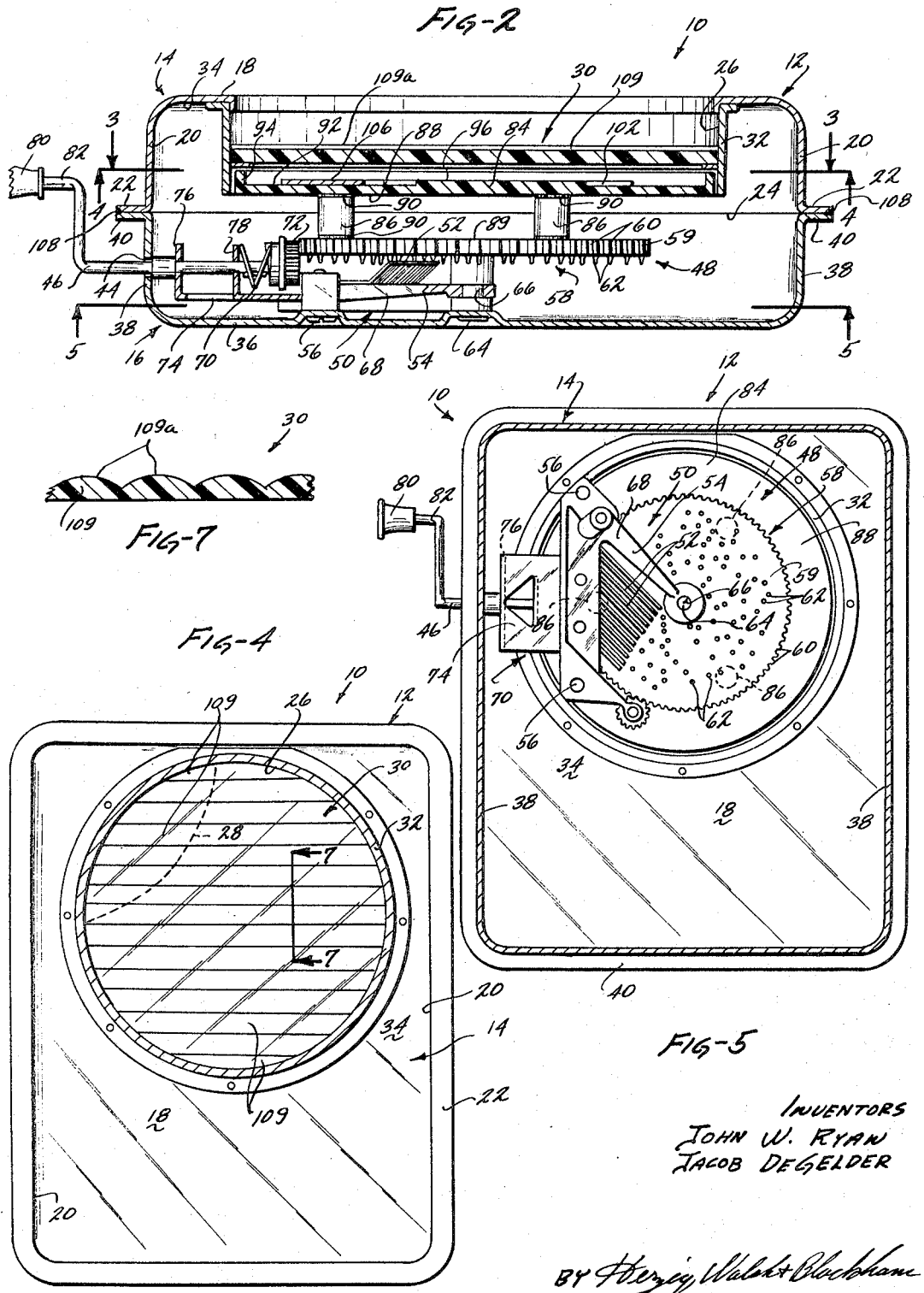

ized Apr. 23, 1968

3,379,084
VISUAL EFFECT MEANS FOR MUSIC BOX TOY
John W. Ryan, Bel-Air, and Jacob De Gelder, Torrance, Calif., assignors to Mattel, Inc., Hawthorne, Calif., a corporation of California
Filed Jan. 3, 1966, Ser. No. 518,321
11 Claims. (Cl. 84—97)

The present invention relates to a new and useful visual effect means for a music box toy and more particularly to visual display means in combination with a music box for producing a pleasant visual effect when the music box is actuated.

Music boxes are well known wherein music means includes musical scale means in the form of a music comb having vibrator teeth which are vibrated by plucking means engaging the teeth during movement of the plucking means past the teeth. Such music boxes have been incorporated into a number of toys for children. It has been found that the entertainment value of such toys may be enhanced by providing them with various types of animating devices and the like. While generally satisfactory, such toys have the disadvantage that the animating means adds to the first cost of the toy.

Another disadvantage resides in the fact that a number of different types of animating means are rather complicated in operation and difficult to maintain in proper working order.

In view of the foregoing factors and conditions characteristic of music boxes, it is the primary object of the present invention to provide a new and useful visual effect means in combination with a music box not subject to the disadvantages enumerated above and having a visual display means especially designed for enhancing the entertainment value of a music box efficiently, safely and expeditiously.

According to the present invention, visual effect means is provided in combination with a music box of the type having music means including musical scale means in the form of a music comb and a movable element adapted to pluck the music comb. The visual display means is mounted on the movable element for movement therewith. The music box is provided with an aperture for exposing the display means to the view of a user of the music box through viewing means mounted in the aperture for changing the appearance of the visual display means during movement thereof by the movable element.

The movable element may comprise a rotatable turntable incorporated in a disc-type music means of the type more particularly disclosed in Patent No. 2,956,466.

The visual display means may comprise a plurality of different colored, non-uniformally shaped, flat objects loosely mounted on the turntable for rotation therewith while remaining free to slide around thereon. A stirrer having a color and configuration which enhances the visual effect produced is also affixed to the turntable for assuring that the loosely mounted pieces will be moved during rotation of the turntable. A hollow, cylindrical skirt depends from the viewing means and encompasses the turntable in spaced relation therewith to hold the loosely mounted objects captive.

The viewing means may comprise any suitable refractor in the form of a lens or prism which refracts light coming from the loosely mounted objects and the stirrer as the turntable rotates producing many interesting, multi-colored visual displays when viewed by a user of the music box.

A cord may also be provided which is attached to the music box for suspending it from the neck of a child user and held in a substantially vertical position while a crank means forming a part of the music means is actuated to rotate the turntable. When held in a vertical position, the stirrer assures that the loosely mounted pieces will not fall to the bottom of the turntable and remain stationary against the inner wall of the depending skirt.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which like reference characters refer to like elements in the several views.

In the drawings:

FIGURE 2 is an enlarged, cross-sectional view taken along line 2—2 of FIGURE 1;

FIGURE 4 is a cross-sectional view taken along line 4—4 of FIGURE 2;

FIGURE 5 is a cross-sectional view taken along line 5—5 of FIGURE 2;

Figure 1:
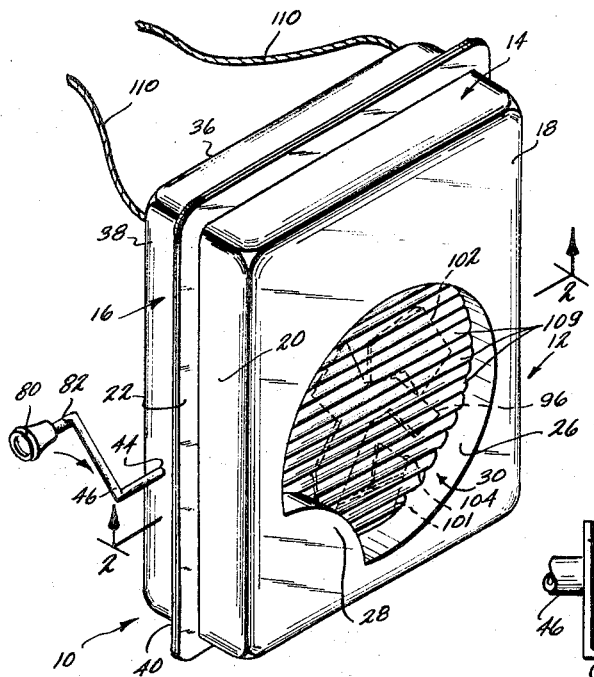
FIGURE 1 is a perspective view of a music box and visual effect means combination of the present invention.

As used herein, the terms "prism," "lens" and "refractor" shall mean anything capable of refracting light.

Referring again to the drawings, a music box and visual effect means toy constituting a presently preferred embodiment of the invention, generally designated 10, includes a housing means 12 having an upper housing half 14 and a lower housing half 16.

The upper housing half 14 includes a closed top wall 18, a depending, encompassing side wall 20 provided with an outwardly extending, encompassing flange 22 and an open bottom 24. An aperture 26 is provided in the top wall 18 and is shown for purposes of illustration, but not of limitation, as being substantially circular with an arcuate interruption formed by extending a top wall portion 28 into the aperture 26 for forming a foundation for a suitable decoration to enhance the appearance of the toy 10. A viewing means in the form of a refractor means 30, which may comprise a lens means or a prism means, is mounted in the aperture 26 and is retained in position therein by a hollow, cylindrical skirt member 32 depending from the underside 34 of the top wall 18.

The lower housing half 16 includes a closed bottom wall 36, an upstanding, encompassing side wall 38 having an encompassing, outwardly extending flange 40 and an open top 42. The side wall 38 is provided with an aperture 44 through which a crank 46 extends into operative engagement with a music means 48 of the type disclosed in Patent No. 2,956,466.

The music means 48 includes musical scale means 50 comprising a music comb 52 and a frame 54. The frame 54 is secured to the bottom wall 36 by suitable fastening means, such as the cap screws shown at 56. The music means 48 also includes a movable means 58 having a disc 59 which is provided with peripheral teeth 60 and plucking protuberances 62. The disc 59 is rotatably connected to the music scale means 50 by a pin 64 which engages an aperture 66 provided in an arm 68 forming a part of the frame 54.

Figure 6:
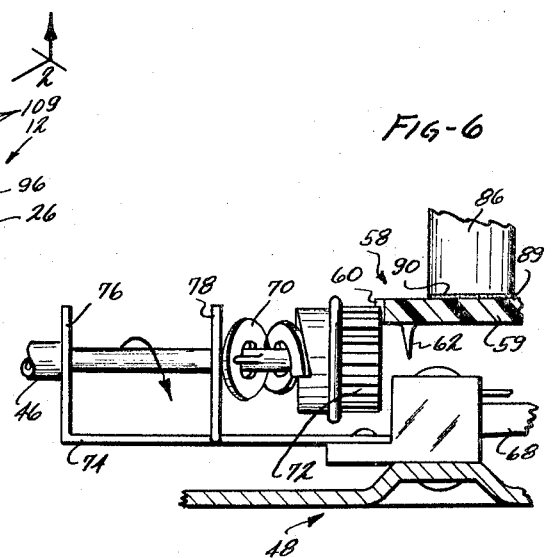
FIGURE 6 is an enlarged, partial cross-sectional view taken along line 7—7 of FIGURE 4.

The movable means 58 may be rotated by the crank 46 which is connected to the disc 59 by a clutch means 70 and a crank gear 72 (FIGURE 6) permitting rotation of the movable means 58 in a counter-clockwise direction, as viewed in FIGURE 5, while preventing rotation thereof in a clockwise direction. The crank 46 is rotatably supported by a bracket 74 having a pair of upwardly struck flanges 76 and 78 and may be actuated by grasping a knob 80 rotatably mounted on the free end 82 thereof. The movable means 58 includes a turntable means 84 which is affixed to the disc 59 in spaced relation therewith by cylindrical spacers 86 secured to the underside 88 of the turntable means 84 and the upper side 89 of the disc 59 by weldments 90.

The upper surface 92 of the turntable means 84 includes a raised, peripheral flange 94 and has a raised, visual-display means 96 affixed thereto. The raised visual display means 96 includes radially-extending arms 98, 99 and 100 which may be of a brilliant color and a non-uniform configuration to enhance the appearance of the visual-display means 96 while performing the function of stirring loosely-mounted, visual-display means 101, 102, 104 and 106, respectively, during rotation of the turntable means 84 in a clockwise direction, as viewed in FIGURE 3. The loosely-mounted, visual-display means 101, 102, 104 and 106 are free to slide about on the upper surface 92 during rotation thereof and are prevented from sliding over the peripheral edge of the turntable means 84 by the flange 94. In addition, the means 101, 102, 104 and 106 are prevented from becoming separated from the toy 10 by the depending skirt 32 which encompasses the turntable means 84 in closely spaced relationship when the lower housing half 16 is assembled to the upper housing half 14 by bringing the flanges 22 and 40 into face-to-face contact and securing them together by suitable weldments 108.

Figure 3:
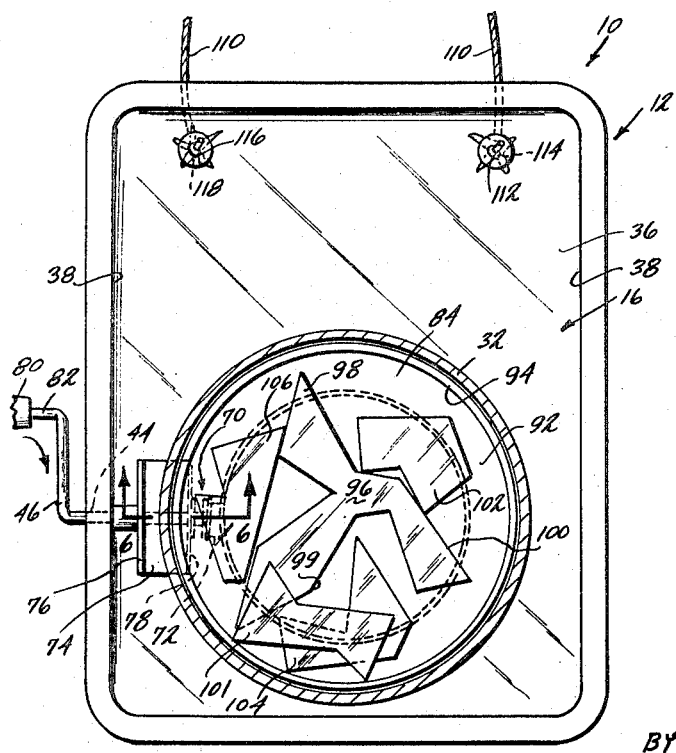
FIGURE 3 is a cross-sectional view taken along line 3—3 of FIGURE 2.

The visual display means 96, 101, 102, 104 and 106 may each be given a bright, different color for producing interesting visual effects when light rays transmitted by the display means are refracted by the prism means 30 during rotation of the turntable means 84. In addition, each of the visual-display means 96, 101, 102, 104 and 106 may be given a different shape, as shown in FIGURE 3.

The refractor means 30 is preferably transparent and may be made from any suitable material such as glass, clear plastic or the like. Light rays transmitted by the visual-display means 96, 101, 102, 104 and 106 are refracted by a plurality of parallel ribs 109 provided in the refractor means 30. Each rib 109 has a rounded upper surface 109a, as shown in FIGURE 7, contributing to the refraction of these light rays.

The toy 10 may be suspended from the neck of a child-user by a cord 110 having a first end 112 secured in an aperture 114 and a second end 116 secured in an aperture 118 provided in the bottom wall 36. When thus suspended, the loosely-mounted visual-display means 101, 102, 104, and 106 are prevented from accumulated in the bottom portion of the toy 10 by the arms 98, 99 and 100 which assure that loosely-mounted visual-display means will rotate with the turntable means 84 while remaining free for limited sliding movement thereon. This produces varying visual effects during rotation of the moveable means 58 by the crank 46.

In use, a child-user may suspend the toy 10 from his neck by the cord 110 with the bottom wall 36 resting against the child's chest. The crank 46 will then be readily accessible for actuation by the right hand of the child while his left hand is used to hold the housing 12, if desired. When the crank 46 is rotated in a clockwise direction, as looking in from the left of FIGURE 3, the turntable means 84 will be rotated in a counter-clockwise direction, as viewed in FIGURE 3, causing the movable display means 101, 102, 104 and 106 to slide about on the turntable means 84 subjacent the refractor means 30 which, by virtue of the refraction of light coming from the colored, visual-display means 96, 101, 102, 104 and 106, produces an effect similar to a kaleidoscope effect. The turntable means 84 is rotated by the crank gear 72 engaging the teeth 60 provided on the disc 59. During this rotation, the plucking protuberances 62 actuate the music comb 52 producing a suitable tune.

Counter-clockwise rotation of the crank 46 causes the clutch 70 to slip with respect to the crank gear 72 so that rotation is not imparted to the movable means 58.

While the particular visual effect means and music box toy combination herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

What is claimed is:

1. In combination with a music box of the type having music means including a movable means adapted to be moved when said music means is actuated, visual effect means, comprising:

visual display means mounted on said movable means for movement therewith; and viewing means mounted in said music box for exposing said display means to the view of a user of said music box, said viewing means changing the appearance of said visual display means during movement thereof by said movable means.

2. A combination as stated in claim 1 wherein said visual-display means comprises colored objects loosely mounted on said movable means for movement with respect thereto while being simultaneously moved along with said movable means.

3. A combination as stated in claim 1 wherein said viewing means comprises prism means for refracting light rays transmitted by said visual display means.

4. A combination as stated in claim 1 wherein said movable means comprises turntable means rotatably mounted in said music box, said turntable means being rotated during actuation of said music means, and wherein said visual display means comprises objects mounted on said turntable means and said viewing means comprises prism means for refracting light rays emanating from said visual display means.

5. A combination as stated in claim 4 wherein said objects are irregularly-shaped, colored objects which are loosely mounted on said turntable means and wherein said music box includes a fixed, cylindrical skirt encompassing said turntable means in spaced relation therewith for retaining said objects on said turntable means.

6. A combination as stated in claim 1 wherein said movable means comprises a rotatable plucking-disc means for plucking a music comb.

7. A combination as stated in claim 6 wherein said plucking-disc means includes a circular plucking disc and a turntable means connected to said disc in spaced, parallel relationship, said visual display means being mounted on said turntable means adjacent said viewing means.

8. A combination as stated in claim 7 wherein said viewing means comprises a prism for refracting light rays emanating from said visual display means.

9. A combination as stated in claim 8 wherein said visual display means comprises flat objects loosely mounted on said turntable means, said turntable means including annular, upstanding flange means for preventing said objects from sliding off of said turntable means during rotation thereof.

10. A toy, comprising:

a first housing half having a top wall, an encompassing side wall and an open bottom, said top wall being provided with an aperture;

a second housing half having a closed bottom wall, an upstanding, encompassing side wall and an open top, said side wall being provided with an aperture;

a hollow, cylindrical skirt depending from said top wall of said first housing half in encompassing relationship with said top wall aperture, said skirt extending into said open top of said second housing half;

turntable means rotatably mounted on said bottom wall of said second housing half within said skirt;

crank means extending through said aperture in said side wall into operative engagement with said turntable means for rotating said turntable means within said skirt;

irregularly shaped, colored objects loosely mounted on said turntable means subjacent said top wall aperture; and prism means mounted in said top wall aperture for refracting light emanating from said objects, whereby a visual effect is produced by rotating said turntable means to move said objects beneath said prism means.

11. A toy as stated in claim 10 wherein said turntable means includes music means for producing a tune during rotation of said turntable means.

References Cited

UNITED STATES PATENTS

| | | | |
|---|---|---|---|
| 2,846,223 | 8/1958 | Nelson | 84—94 |
| 3,006,111 | 10/1961 | Koch | 84—95 |
| 3,114,216 | 12/1963 | Crawford et al. | 84—95 |

RICHARD B. WILKINSON, *Primary Examiner.*

L. R. FRANKLIN, *Assistant Examiner.*